United States Patent
Gole

(10) Patent No.: US 9,575,886 B2
(45) Date of Patent: Feb. 21, 2017

(54) METHODS AND APPARATUS FOR STORING DATA TO A SOLID STATE STORAGE DEVICE BASED ON DATA CLASSIFICATION

(71) Applicant: Marvell World Trade Ltd., St. Michael (BB)

(72) Inventor: Abhijeet P. Gole, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 215 days.

(21) Appl. No.: 14/165,844

(22) Filed: Jan. 28, 2014

(65) Prior Publication Data

US 2014/0215136 A1    Jul. 31, 2014

Related U.S. Application Data

(60) Provisional application No. 61/757,824, filed on Jan. 29, 2013.

(51) Int. Cl.
*G06F 12/02* (2006.01)
*G06F 3/06* (2006.01)

(52) U.S. Cl.
CPC .......... *G06F 12/0246* (2013.01); *G06F 3/064* (2013.01); *G06F 3/0616* (2013.01); *G06F 3/0679* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 5,541,886 | A | 7/1996 | Hasbun |
| 5,859,795 | A | 1/1999 | Rolandi |
| 6,466,476 | B1 | 10/2002 | Wong et al. |
| 6,728,133 | B2 | 4/2004 | Shimizu |
| 8,046,525 | B2 | 10/2011 | Chae et al. |

(Continued)

FOREIGN PATENT DOCUMENTS

| | | |
|---|---|---|
| EP | 0 788 113 | 8/1997 |
| EP | 2 028 661 | 2/2009 |

(Continued)

OTHER PUBLICATIONS

International Search Report for PCT Application No. PCT/US2014/013353 dated Apr. 11, 2014.

(Continued)

*Primary Examiner* — Brian Peugh
*Assistant Examiner* — Dustin Bone

(57) ABSTRACT

Systems and methods for storing data to a non-volatile storage device are provided. A request to store data to the storage device at a given address corresponding to one of a plurality of regions of the storage device is received. A region classification map associated with the storage device associates a classification with each of the plurality of regions. A determination is made based on the region classification map as to which classification is associated with the one of the plurality of regions corresponding to the given address. The data is stored at the given address in response to determining that the one of the plurality of regions is associated with a first classification. The data is stored to an alternate location in response to determining that the one of the plurality of regions is associated with a second classification.

20 Claims, 2 Drawing Sheets

(56) References Cited

U.S. PATENT DOCUMENTS

| | | |
|---|---|---|
| 2003/0007384 A1 | 1/2003 | Shimizu |
| 2003/0053333 A1 | 3/2003 | Rudelic et al. |
| 2005/0052934 A1 | 3/2005 | Tran et al. |
| 2006/0095793 A1 | 5/2006 | Hall |
| 2007/0025151 A1 | 2/2007 | Lee |
| 2007/0050642 A1 | 3/2007 | Flynn et al. |
| 2007/0156659 A1 | 7/2007 | Lim |
| 2007/0266291 A1 | 11/2007 | Toda et al. |
| 2008/0002468 A1 | 1/2008 | Hemink |
| 2008/0072120 A1 | 3/2008 | Radke |
| 2008/0189473 A1 | 8/2008 | Murray |
| 2008/0215801 A1 | 9/2008 | Tan et al. |
| 2008/0313493 A1 | 12/2008 | Roohparvar et al. |
| 2009/0055605 A1 | 2/2009 | Wu et al. |
| 2009/0080247 A1 | 3/2009 | Lasser |
| 2009/0193184 A1 | 7/2009 | Yu et al. |
| 2010/0146193 A1* | 6/2010 | Jang .................. G06F 12/0804 711/103 |
| 2011/0082976 A1 | 4/2011 | Wu et al. |
| 2011/0138106 A1* | 6/2011 | Prabhakaran ....... G06F 12/0804 711/103 |
| 2011/0264843 A1* | 10/2011 | Haines ................ G06F 12/0246 711/103 |
| 2012/0110258 A1* | 5/2012 | Lakey ................. G06F 12/0888 711/113 |
| 2012/0159054 A1 | 6/2012 | Cheon et al. |
| 2012/0209893 A1* | 8/2012 | Kim .................. G06F 17/30129 707/822 |
| 2012/0317342 A1* | 12/2012 | Choi ................... G06F 12/0246 711/103 |
| 2014/0379990 A1* | 12/2014 | Pan ..................... G06F 12/0804 711/135 |

FOREIGN PATENT DOCUMENTS

| | | |
|---|---|---|
| WO | WO03/025948 | 3/2003 |
| WO | WO2007/037757 | 4/2007 |

OTHER PUBLICATIONS

Qun, L., et al., "An approach to attribute-based object access", *J. Huazhong Univ. of Sci. & Tech. (Nature Science Edition)*, vol. 34, No. 12, Dec. 2006 (English translation).

* cited by examiner

METHODS AND APPARATUS FOR STORING DATA TO A SOLID STATE STORAGE DEVICE BASED ON DATA CLASSIFICATION

CROSS REFERENCE TO RELATED APPLICATION

This disclosure claims the benefit of U.S. Provisional Application No. 61/757,824, filed Jan. 29, 2013, which is incorporated herein by reference in its entirety.

FIELD OF USE

The present disclosure relates generally to solid state storage device systems and methods, and more particularly, to efficiently storing information in a solid state storage device based on data classification.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, is neither expressly nor impliedly admitted as prior art against the present disclosure.

Typical solid state storage devices (e.g., NAND flash storage devices) operate by erasing previously stored information before writing new information. This is known as "garbage collection". Due to this type of operation, storing data to a same range of storage locations results in inefficiencies such as latencies. As such, these typical devices inefficiently handle continuous random writes to a same range of locations in the solid state storage devices.

SUMMARY

Systems and methods for storing data to a non-volatile storage device are provided. In some embodiments, a request to store data to the storage device at a given address corresponding to one of a plurality of regions of the storage device is received. A region classification map associated with the storage device associates a classification with each of the plurality of regions. A determination is made based on the region classification map as to which classification is associated with the one of the plurality of regions corresponding to the given address. The data is stored at the given address in response to determining that the one of the plurality of regions is associated with a first classification. The data is stored to an alternate location in response to determining that the one of the plurality of regions is associated with a second classification. In some implementations, the alternate location is a temporary storage location that is associated with an address of the storage device that is different from the given address.

In some embodiments, the region classification map is generated based on prior storage operations performed on the storage device. In some embodiments, the region classification map is generated by an application from which the request to store the data was received.

In some embodiments, a given region of the plurality of regions of the storage device is associated with the first classification when a frequency of requests to store data to an address corresponding to the given region is less than a threshold value or when a threshold number of requests to store data to addresses corresponding to the given region are received in sequence. In some embodiments, a given region of the plurality of regions of the storage device is associated with the second classification when a frequency of requests to store data to an address corresponding to the given region is greater than a threshold value and when a threshold number of requests to store data to addresses corresponding to the given region are received in arbitrary order.

In some embodiments, the data is stored to the storage device at the given address. The data is stored to a temporary storage location in a buffer and the data is transferred from the buffer to the storage device.

In some embodiments, the request to store the data s stored in a log. The log includes a plurality of previously received requests to store data to a given region of the storage device that is associated with the second classification. The requests to store data are ordered in the log sequentially according to addresses associated with each request. Multiple of the plurality of requests to store data to an identical address are merged into a single request to store data. The ordered and merged requests in the log are stored to the storage device at the addresses associated with each of the requests. In some implementations, the ordering and merging is performed after receiving a threshold number of requests to store data to the given region of the storage device that is associated with the second classification. In some implementations, the non-volatile storage device is a solid state storage device and the log is in a dedicated region of the storage device.

BRIEF DESCRIPTION OF THE DRAWINGS

The details of one or more implementations are set forth in the accompanying drawings and the description below. Other features and various advantages will be more apparent upon consideration of the following detailed description, taken in conjunction with the accompanying drawings in which.

DETAILED DESCRIPTION

This disclosure generally relates to efficiently storing information in a solid state storage device based on data classification. For illustrative purposes, this disclosure is described in the context of a solid state storage device (e.g., a flash storage device or a NAND based storage device). It should be understood, however, that this disclosure is applicable to any other type of non-volatile storage device (e.g., magnetic storage device, ROM, PROM, EPROM, EEPROM, nvSRAM, FeRAM, MRAM, PRAM, CBPAM, SONOS, PRAM, NRAM, Millipede memory, or holographic storage device).

Figure 1:
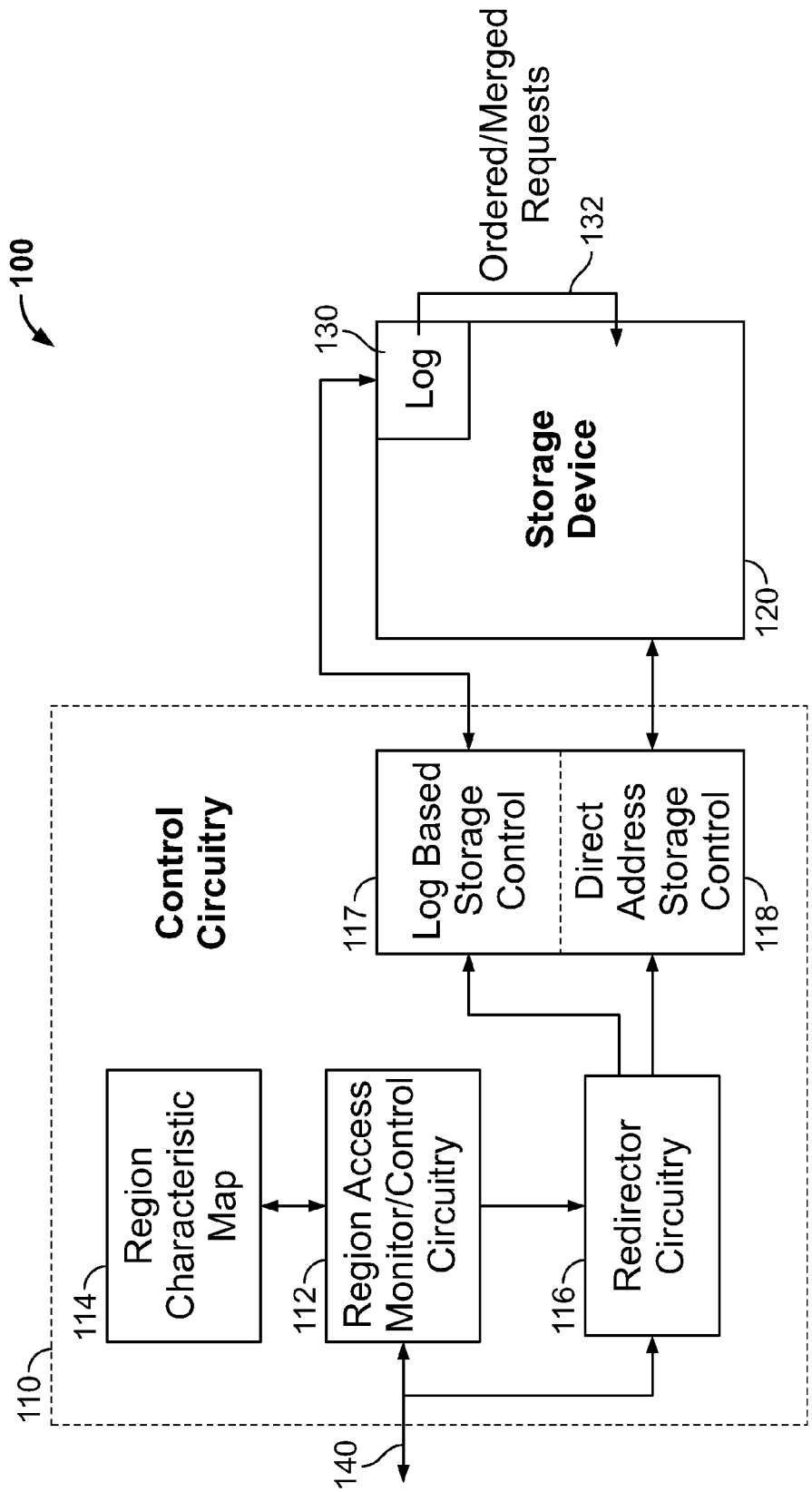
FIG. 1 is a diagram of an illustrative storage device system in accordance with an embodiment of the present disclosure.

FIG. 1 is a diagram of an illustrative storage device system 100 in accordance with an embodiment of the present disclosure. System 100 includes control circuitry 110, a solid state storage device 120, and a log 130. In some implementations, log 130 is a reserved region of storage device 120. For example, log 130 may correspond to a predetermined number of storage locations of storage device 120 (e.g., 1 gigabyte) which are only visible to control circuitry 110 and not to a user or an external application. In some implementations, log 130 is implemented by a separate volatile or non-volatile storage device (e.g., NVRAM, DRAM, SDRAM, SRAM, T-RAM, Z-RAM, TTRAM, or any combination thereof) from storage device 120. For example, log 130 may be included as part of control circuitry 110 and/or may be coupled to control circuitry 110 and to storage device 120.

Control circuitry 110 may include region access monitor circuitry 112, a region characteristic (classification) map 114, redirector circuitry 116, log based storage control circuitry 117, and direct address storage control circuitry 118. In some embodiments, control circuitry 110 may receive data 140 from another system component (not shown). For example, data 140 may be provided by an application or another storage device (e.g., DRAM). Data 140 may include a user data portion and an address portion. In some implementations, data 140 may include a classification portion that indicates what type of classification the user data is. Specifically, the application that instructs control circuitry 110 to store data 140 may indicate the classification of the data. For example, data may be a first classification, a second classification, or a third classification.

The "first classification" may identify or be associated with a set of data that is written to random or non-sequential storage locations (e.g., addresses), where such storage locations are frequently accessed (e.g., a number of requests to store data to these locations exceeds a predetermined threshold). The "second classification" may identify or be associated with a set of data that is written to sequential storage locations (e.g., addresses), where such storage locations are frequently accessed (e.g., a number of requests to store data to these locations exceeds a predetermined threshold). The "third classification" may identify or be associated with a set of data that is written to random or non-sequential storage locations (e.g., addresses), where such storage locations are infrequently accessed (e.g., a number of requests to store data to these locations does not exceed a predetermined threshold).

Control circuitry 110 may process data 140 to identify the classification of the data. For example, region access monitor circuitry 112 may retrieve the address portion of data 140 and determine whether the address portion corresponds to a first, second or third classification. Region access monitor circuitry 112 may determine based on the classification of the address portion of data 140 whether the address portion and user data portion of data 140 should be cached for later storage to storage device 120 (log based storage) or whether the user data portion of data 140 should be directly stored to storage device 120 at the address specified by the address portion of data 140 (direct map storage). For example, data 140 that is determined to be of the first classification may be selected for log based storage and data 140 that is determined to be of the second or third classification may be selected for direct map storage.

In some implementations, region access monitor circuitry 112 may determine the classification of the address portion based on the classification indicated by data 140. In some implementations, region access monitor circuitry 112 may cross reference the address portion of data 140 with a region characteristic map 114 to determine whether data 140 is associated with a first, second or third classification. Region characteristic map 114 may be a database that maps a set of addresses or storage locations of storage device 120 to different classifications. In some implementations, region characteristic map 114 may be generated or updated by an application. Specifically, the application that will, be performing various read/write operations on storage device 120 may program or configure region characteristic map 114 with information that indicates the classification for various addresses (or address regions) of storage device 120. In some implementations, region characteristic map 114 is updated based on a historical, statistical or on going analysis of addresses being received with data 140. In such circumstances, region access monitor circuitry 112 analyzes the addresses and performs any updates to the address information stored in region characteristic map 114.

Data that is cached for later storage (selected for log based storage) is stored to log 130. After a predetermined number of data 140 are stored to log 130 or after a predetermined period of time (e.g., a flush condition being satisfied), entries (that each include various address and data portions) stored in log 130 are merged, ordered and before being subsequently stored or flushed to storage device 120. The operation of log 130 is described in greater detail below. Data that is directly stored to storage device 120 (selected for direct map storage), is routed directly to storage device 120 (or through a buffer (not shown)) and stored to the address specified by the address portion of data 140.

In some embodiments, region access monitor circuitry 112 may indicate to redirector circuitry 116 whether the data is selected for log based storage or direct map storage. Based on the indication received from region access monitor circuitry 112, redirector circuitry 116 sends data 140 to log based storage control circuitry 117 or direct address storage control 118 to be written to storage device 120. Specifically, data that is selected for log based storage may be routed by redirector circuitry 116 to log based storage control circuitry 117. Alternatively, data that is selected for direct map storage may be routed by redirector circuitry 116 to direct address storage control 118.

Log based storage control circuitry 117 may receive data 140 and store the data to log 130. Specifically, log based storage control circuitry 117 may store the address portion and the user data portion of data 140 to a given entry in log 130. As such, log 130 may maintain multiple entries of data 140 and specifically multiple address and user data portions may be maintained in different entries of log 130. Log based storage control circuitry 117 may process data stored in log 130 to sort and merge the data for subsequently writing the data in log 130 to storage device 120. Log based storage control circuitry 117 may transfer data stored in log 130 to storage device 120 when a condition is satisfied (e.g., a flush condition). To transfer the data stored in log 130 to storage device 120, log based storage control circuitry 117 may, for each entry in log 130, store the data in a given entry to a location of storage device 120 identified by the address specified in the entry. In some implementations, the condition that causes log based storage circuitry 117 to transfer data from log 130 to storage device 120 may include a predetermined number of entries (that correspond to different requests to write data to a given location of storage device 120) having been created and stored to log 130 and/or passage of a predetermined period of time.

In some embodiments, when the flush condition is satisfied or in an ongoing continuous manner, log based storage control circuitry 117 may analyze the addresses of each entry stored in log 130. Log based storage control circuitry 117 may sort the entries in log 130 according to ascending or descending order of the addresses stored in the entries. As such, when the data portion of the entries in log 130 is subsequently transferred or flushed to storage device 120, the data is written to storage device 120 in a sequential manner (e.g., data is written in sequence to a block of addresses that have been sorted in log 130).

In some implementations, log based storage control circuitry 117 may prune or merge entries in log 130 corresponding to duplicate or identical addresses stored in the entries of log 130. Such pruning or merging reduces the number of write operations performed on storage device 120 when the data is subsequently transferred or flushed to storage device 120. Specifically, log based storage control circuitry 117 may identify identical addresses that are stored in entries of log 130. Log based storage control circuitry 117 may retain only the latest entry (e.g., the last written entry in log 130) having the duplicate address. Specifically, log based storage control circuitry 117 may delete every entry having the duplicate address that precedes the latest entry having the duplicate address. Log based storage control circuitry 117 may perform the sorting and merging in any given order. Specifically, log based storage control circuitry 117 may first merge and then sort the entries in log 130. Alternatively, log based storage control circuitry 117 may first sort and then merge the entries in log 130.

As discussed above, region characteristic map 114 maps address regions of storage device 120 to different classifications. In some implementations, the information and classifications stored in region characteristic map 114 may be generated, maintained and updated by region access monitor circuitry 112 every time a new request to store or read data is received or after a predetermined number of requests to store or read data are received. The classification assigned to a given address region (e.g., a given 1 gigabyte region) may depend on the frequency of access and type of access to that region.

To generate the region classification information stored in region characteristic map 114 region access monitor circuitry 112 may classify segments of all or part of the address space of storage device 120 according to access type and/or temperature. Region access monitor circuitry 112 may separate the address space of storage device 120 into multiple segments of equal or unequal size (e.g., 1 gigabyte size segments). For each segment, region access monitor circuitry 112 may maintain or store a last access address (LBA) (e.g., the address specified by a previous read or write request to address within the given segment), the last access size (e.g., the full range of addresses covered by the request to read/write data to the last access address), the total number of accesses, the number of sequential accesses, the number of random accesses and the access type. Upon receiving a read/write, request to an address within a given segment, region access monitor circuitry 112 may determine whether the address follows sequentially the address specified by a previous request to read or write data to the same segment. To make this determination, region access monitor circuitry 112 may determine whether the address specified by a current request to read or write data to the segment is the next adjacent address that follows the value of the address specified by the previous request plus the last access size (e.g., the amount of data written to the previous address). Specifically, the previously stored address may indicate a starting point and the data size may indicate the ending point of the range of addresses covered by the previous request to read or write data to the segment. Accordingly, to determine whether a current request to read or write data to an address within the segment follow sequentially from a previous request, region access monitor circuitry 112 has to account for the entire address space that was covered by the previous request.

In response to determining that the current address to which the read/write request requests access follows sequentially the address specified by the previous request to read or write data to the same segment, region access monitor circuitry 112 may increment the value corresponding to the number of sequential accesses. Alternatively, in response to determining that the current address to which the read/write request requests access does not follow sequentially the address specified by the previous request to read or write data to the same segment, region access monitor circuitry 112 may increment the value corresponding to the number of random accesses.

After each request to read/write information to an address that is within a given segment, region access monitor circuitry 112 may increment the value of total number of accesses. When the value of the total number of accesses of a given segment exceeds a predetermined threshold, region access monitor circuitry 112 may assign an access type to the segment. To assign the access type to a segment, the total number of accesses may be compared with the number of random accesses and/or the number of sequential accesses. In some implementations, when the ratio of the number of sequential accesses to the total number of accesses of a given segment is greater than the ratio of the number of random accesses to the total number of accesses of the given segment, the segment may be assigned as a random access type segment. Specifically, if the majority of accesses to the segment were random after a given number of accesses, the segment may be assigned as a random access type segment. Alternatively, if the majority of accesses to the segment were sequential after a given number of accesses, the segment may be assigned as a sequential access type segment.

In some embodiments, region access monitor circuitry 112 may also or alternatively classify segments according to temperature. It should be understood that the term "temperature" is not the conventional use of the term, as used herein the term temperature indicates data access frequency. For each segment, region access monitor circuitry 112 may maintain or store a last access time value, a temperature value, a data in cache log flag and a direct mapped flag. Specifically, upon receiving a request to read/write data to an address within a segment, the last access time value may be updated to reflect the current time. If the next request to read/write data to an address within the same segment is within a threshold period of time after the last access time value, the value of the temperature may be incremented. Alternatively, if the next request to read/write data to an address within the same segment is beyond the threshold period of time after the last access time value, the value of the temperature may be decremented. In some implementations, when region access monitor circuitry 112 selects the received data for log based storage, region access monitor circuitry 112 may set the data in cache log flag to true and the direct mapped flag to false for the segment corresponding to the address selected for log based storage. Alternatively, when region access monitor circuitry 112 selects the received data for direct mapped based storage, region access monitor circuitry 112 may set the data in cache log flag to false and the direct mapped flag to true for the segment corresponding to the address selected for direct mapped based storage.

In some embodiments, whenever the flush condition is satisfied and the data is transferred from log 130 to storage device 120, the temperature value, for each region where the data in cache log flag is set to true, may be increased. Alternatively, whenever the flush condition is satisfied and the data is transferred from log 130 to storage device 120, the temperature value, for each region where the direct mapped flag is set to true, may be decreased. This results in segments previously identified as having high temperature values having their temperature reduced by a certain amount over time if access to those segments becomes less frequent or sequential in type.

Region access monitor circuitry 112 may use the information maintained and updated about the access type and temperature of each segment to set a classification to a region identified in region characteristic map 114. Each region identified in region characteristic map 114 may identify one or more segments for which region access monitor circuitry 112 has maintained information. For example, region access monitor circuitry 112 may process the information stored for a first segment to determine the access type and temperature value of the segment. When the access type is determined to be sequential and the temperature value is higher than a threshold or lower than a threshold, region access monitor circuitry 112 may classify the first segment as the second classification (e.g., a classification which causes requests to write data to an address within the segment to be performed in a direct mapped storage manner). Specifically, when the access type is determined to be sequential, region access monitor circuitry 112 may classify the first segment as the second classification regardless of the temperature value of the segment.

Region access monitor circuitry 112 may process information stored for a second segment that is adjacent to the first segment. When the access type is determined to be sequential and the temperature value is higher than a threshold or lower than a threshold for the second segment, region access monitor circuitry 112 may also classify the second segment as the second classification. Since the first segment and the second segment are of the same classification (e.g., the second classification), region access monitor circuitry 112 may combine the two segments into the same region identified by region characteristic map 114. Accordingly, a first region identified by region characteristic map 114 may correspond to the address space that spans the first and second segments and is associated with the second classification. Any data that is received with a request to be stored to an address within the address space defined by the first region may be selected for direct mapped storage since it is of the second classification.

Region access monitor circuitry 112 may process information stored for each segment. When the access type is determined to be random and the temperature value is lower than a threshold for a given segment, region access monitor circuitry 112 may classify the given segment as the third classification (e.g., a classification which causes requests to write data to an address within the segment to be performed in a direct mapped storage manner). When the access type is determined to be random and the temperature value is higher than a threshold for the given segment, region access monitor circuitry 112 may classify the given segment as the first classification (e.g., a classification which causes requests to write data to an address within the segment to be performed in a log based storage manner). When two or more adjacent segments are assigned the same classification, region access monitor circuitry 112 may combine the two or more segments into a region that spans the address space of the two or more segments and store their common classification in region characteristic map 114 for the region that spans the address space of the two or more segments.

In some implementations, log based storage control circuitry 117 may maintain a look-up table indicating where different data is stored in log 130. Specifically the look-up table may identify the log storage location for every address stored in an entry of log 130. For example, a previously received request to write data to address 5 of storage device 120 may be stored (with the data and address) in location 3 of log 130 (e.g., because the address was selected for log based storage). Accordingly, when a subsequent request to read information from address 5 of storage device 120 is received, the look-up table may be cross referenced to determine whether an entry associated with the requested address exists in log 130. In such a case, the look-up table may indicate that the data is stored in location 3 of log 130. Using the information in the look-up table, region access monitor circuitry 112 retrieves the data from location 3 of log 130 instead of address 5 of storage device 120 and returns the retrieved data to the requester. In particular, when a request to read a given address from storage device 120 is received, region access monitor circuitry 112 first checks whether the data for the requested address is still in log 130. Specifically, the flush condition may not yet have been satisfied and hence the data for a given address may be stored in log 130 instead of at the corresponding address of storage device 120. Accordingly, if a request to read the address is routed directly to storage device 120, the wrong data would be retrieved. The look-up table may be checked by region access monitor circuitry 112 to determine whether data for the requested address has an entry in log 130. When the requested address has an entry in log 130, the look-up table returns the location within log 130 of the requested data. When the requested address does not have an entry in log 130, no entry is provided in the look-up table and accordingly the data is retrieved directly from the requested address of storage device 120.

In some cases, multiple writes to the address corresponding to the read request (requested address) may have been received in the past. Accordingly, multiple entries may be created in log 130 and hence multiple log locations may be identified in the look-up table for the requested address. In such circumstances, the last written data corresponding to the requested address may be retrieved from the corresponding location in log 130 instead of the requested address of storage device 120.

Figure 2:
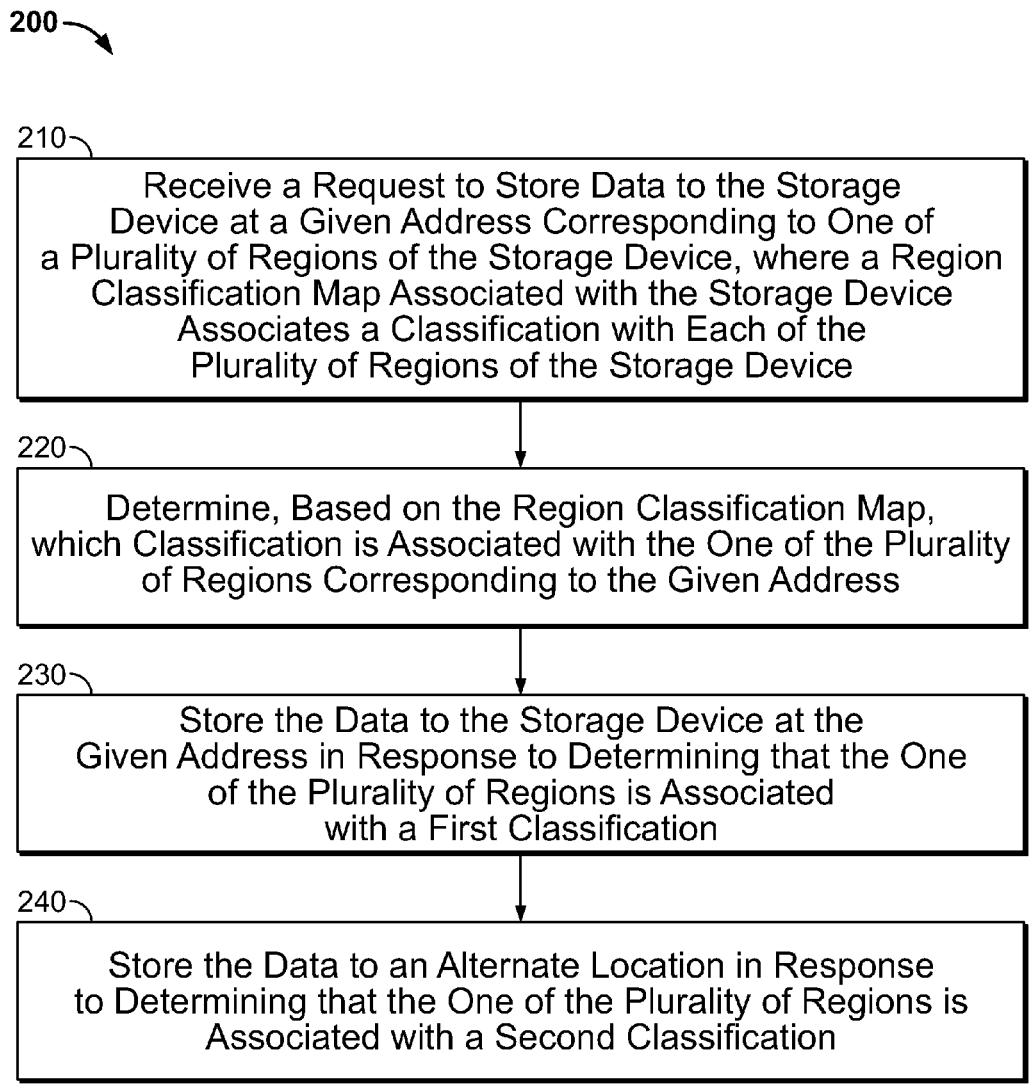
FIG. 2 illustrates a process for storing information in a solid state storage device based on data classification in accordance with an embodiment of the present disclosure.

FIG. 2 illustrates a process 200 for storing information in a solid state storage device based on data classification in accordance with an embodiment of the present disclosure. At 210, a request to store data to the storage device at a given address corresponding to one of a plurality of regions of the storage device is received. A region classification map associated with the storage device may associate a classification with each of the plurality of regions of the storage device. For example, data 140 may be received by control circuitry 110 (FIG. 1). Data 140 may include an address portion and a data portion. The address portion may correspond to a given region of the storage device that is classified by region characteristic map 114.

At 220, the classification associated with the one of the plurality of regions corresponding to the given address is determined based on the region classification map. For example, region access monitor circuitry 112 may cross-reference the address portion of data 140 with region characteristic map 114 to determine the classification associated with the region corresponding to the address portion.

At 230, the data is stored to the storage device at the given address in response to determining that the one of the plurality of regions is associated with a first classification. For example, when the address is determined to be the second classification (e.g., an address corresponding to data written to sequential address blocks), the data is routed to direct address storage control 118 to be written to the address of storage device 120 specified by the address portion of data 140.

At 240, the data is stored to an alternate location in response to determining that the one of the plurality of regions is associated with a second classification. For example, when the address is determined to be the first classification (e.g., an address corresponding to data written to random address blocks), the data is routed to log based storage control 117 to be written to log 130 instead of the address of storage device 120 specified by the address portion of data 140.

The foregoing describes methods and an apparatus for storing information in a solid state storage device based on data classification. The above-described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software.

What is claimed is:

1. A method for storing data to a non-volatile storage device, the method comprising:
    storing a plurality of data storage requests in a first order in an alternate location comprising a log, each respective one of the data storage requests having a respective data portion and a respective memory address indicating to where in the non-volatile storage device the data portion is to be written;
    receiving an additional request to store additional data to the storage device at a given address corresponding to one of a plurality of regions of the storage device, wherein a region classification map associated with the storage device associates a classification of a plurality of classifications with each of the plurality of regions of the storage device, wherein a first of the plurality of classifications represents a plurality of sequentially received addresses, and wherein a second of the plurality of classifications represents non-sequentially received addresses;
    determining, based on the region classification map, which of the plurality of classifications is associated with the one of the plurality of regions corresponding to the given address;
    storing the additional data to the storage device at the given address in response to determining that the one of the plurality of regions is associated with the first classification; and
    in response to determining that the one of the plurality of regions is associated with the second classification:
        storing the additional request including the additional data and the given address to the log;
        sorting and merging the plurality of data storage requests and the additional request stored in the log into a second order, different from the first order, based on the respective memory address of each respective one of the data storage requests and the given address; and
        writing the sorted and merged plurality of data storage requests, including the additional request in the log, to the non-volatile storage device according to the second order.

2. The method of claim 1, wherein the alternate location is a temporary storage location that is associated with an address of the storage device that is different from the given address.

3. The method of claim 1 further comprising generating the region classification map based on prior storage operations performed on the storage device.

4. The method of claim 1, wherein the region classification map is generated by an application from which the additional request to store the additional data was received.

5. The method of claim 1, wherein a given region of the plurality of regions of the storage device is associated with the first classification when a frequency of requests to store data to an address corresponding to the given region is less than a threshold value or when a threshold number of requests to store data to addresses corresponding to the given region are received in sequence.

6. The method of claim 1, wherein a given region of the plurality of regions of the storage device is associated with the second classification when a frequency of requests to store data to an address corresponding to the given region is greater than a threshold value and when a threshold number of requests to store data to addresses corresponding to the given region are received in arbitrary order.

7. The method of claim 1, wherein storing the additional data to the storage device at the given address comprises:
    storing the additional data to a temporary storage location in a buffer; and
    transferring the additional data from the buffer to the storage device.

8. The method of claim 1, wherein storing the additional data to an alternate location comprises:
    storing the additional request to store the additional data in the log, wherein the at least one respective memory address associated with one of the plurality of data storage requests in the log is associated with the second classification;
    merging multiple ones of the plurality of data storage requests associated with an identical address into a single request to store data; and
    storing the sorted and merged requests in the log to the storage device at the respective memory address of each respective one of the data storage requests.

9. The method of claim 8, wherein the sorting and merging is performed after receiving a threshold number of requests to store data to the given region of the storage device that is associated with the second classification.

10. The method of claim 8, wherein the non-volatile storage device is a solid state storage device and the log is in a dedicated region of the storage device.

11. A system for storing data to a non-volatile storage device, the system comprising:
    control circuitry configured to:
    store a plurality of data storage requests in a first order in an alternate location comprising a log, each respective one of the data storage requests having a respective data portion and a respective memory address indicating to where in the non-volatile storage device the data portion is to be written;
    receive an additional request to store additional data to the storage device at a given address corresponding to one of a plurality of regions of the storage device, wherein a region classification map associated with the storage device associates a classification of a plurality of classifications with each of the plurality of regions of the storage device, wherein a first of the plurality of classifications represents a plurality of sequentially received addresses, and wherein a second of the plurality of classifications represents non-sequentially received addresses;

determine, based on the region classification map, which of the plurality of classifications is associated with the one of the plurality of regions corresponding to the given address;

store the additional data to the storage device at the given address in response to determining that the one of the plurality of regions is associated with the first classification; and in response to determining that the one of the plurality of regions is associated with the second classification:

store the additional request including the additional data and the given address to the log;

sort and merge the plurality of data storage requests and the additional request stored in the log into a second order, different from the first order, based on the respective memory address of each respective one of the data storage requests and the given address; and write the sorted and merged plurality of data storage requests including the additional request in the log to the non-volatile storage device according to the second order.

12. The system of claim 11, wherein the alternate location is a temporary storage location that is associated with an address of the storage device that is different from the given address.

13. The system of claim 11, wherein the control circuitry is further configured to generate the region classification map based on prior storage operations performed on the storage device.

14. The system of claim 11, wherein the region classification map is generated by an application from which the additional request to store the additional data was received.

15. The system of claim 11, wherein a given region of the plurality of regions of the storage device is associated with the first classification when a frequency of requests to store data to an address corresponding to the given region is less than a threshold value or when a threshold number of requests to store data to addresses corresponding to the given region are received in sequence.

16. The system of claim 11, wherein a given region of the plurality of regions of the storage device is associated with the second classification when a frequency of requests to store data to an address corresponding to the given region is greater than a threshold value and when a threshold number of requests to store data to addresses corresponding to the given region are received in arbitrary order.

17. The system of claim 11, wherein the control circuitry is further configured to store the additional data to the storage device at the given address by:

storing the additional data to a temporary storage location in a buffer; and transferring the additional data from the buffer to the storage device.

18. The system of claim 11, wherein the control circuitry is further configured to store the additional data to an alternate location by:

storing the additional request to store the additional data in the log, wherein the at least one respective memory address associated with one of the plurality of data storage requests in the log is associated with the second classification;

merging multiple ones of the plurality of data storage requests associated with an identical address into a single request to store data; and storing the sorted and merged requests in the log to the storage device at the respective memory address of each respective one of the data storage requests.

19. The system of claim 18, wherein the control circuitry is further configured to perform the sorting and merging after receiving a threshold number of requests to store data to the given region of the storage device that is associated with the second classification.

20. The system of claim 18, wherein the non-volatile storage device is a solid state storage device and the log is in a dedicated region of the storage device.

* * * * *